(12) United States Patent
Lu et al.

(10) Patent No.: US 12,322,160 B2
(45) Date of Patent: Jun. 3, 2025

(54) IMAGE CLASSIFICATION MODEL TRAINING METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventors: Donghuan Lu, Shenzhen (CN); Junjie Zhao, Shenzhen (CN); Kai Ma, Shenzhen (CN); Yefeng Zheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 428 days.

(21) Appl. No.: 17/964,739

(22) Filed: Oct. 12, 2022

(65) Prior Publication Data
US 2023/0035366 A1 Feb. 2, 2023

Related U.S. Application Data

(63) Continuation of application No. PCT/CN2021/102530, filed on Jun. 25, 2021.

(30) Foreign Application Priority Data

Aug. 6, 2020 (CN) .......................... 202010781930.0

(51) Int. Cl.
*G06V 10/32* (2022.01)
*G06V 10/764* (2022.01)
*G06V 10/774* (2022.01)

(52) U.S. Cl.
CPC ............ *G06V 10/774* (2022.01); *G06V 10/32* (2022.01); *G06V 10/764* (2022.01)

(58) Field of Classification Search
CPC .... G06V 10/774; G06V 10/32; G06V 10/764; G06V 10/763; G06V 10/82;
(Continued)

(56) References Cited

U.S. PATENT DOCUMENTS

| 2018/0089543 A1 | 3/2018 | Merler et al. |
| 2018/0173997 A1* | 6/2018 | Shen ...................... G06F 18/217 |

FOREIGN PATENT DOCUMENTS

| CN | 108197666 A | 6/2018 |
| CN | 110738263 A | 1/2020 |
| CN | 111738365 A | 10/2020 |

OTHER PUBLICATIONS

Krause Andreas et al. "Discriminative clustering by regularized information maximization", 2010, p. 775-783 Advances in neural information processing systems.
(Continued)

*Primary Examiner* — Stephen P Coleman
(74) *Attorney, Agent, or Firm* — ANOVA LAW GROUP, PLLC

(57) ABSTRACT

An image classification model training method and apparatus are provided. Classification results of each image outputted by an image classification model are obtained. When the classification results outputted by the image classification model do not meet a reference condition, a reference classification result is constructed based on the classification results outputted by the image classification model. Because the reference classification result can indicate a probability that images belong to each class, a parameter of the image classification model is updated to obtain a trained image classification model based on a total error value between the classification results of the each image and the reference classification result.

20 Claims, 8 Drawing Sheets

(58) Field of Classification Search
CPC ...... G06N 3/0464; G06N 3/084; G06N 3/088; G06N 3/045; G06T 2207/10024; G06T 2207/20076; G06T 2207/20081; G06T 2207/20084; G06T 2207/30101; G06T 7/00; G06F 18/2414; G06F 18/254; G06F 18/2415
USPC .......................................................... 382/159
See application file for complete search history.

(56) References Cited

OTHER PUBLICATIONS

Weihua Hu et al. "Learning discrete representations via information maximizing self-augmented training" 2017, vol. 70, p. 1558-1567. Proceedings of the 34th International Conference on Machine Learning.

Xu Ji et al. "Invariant information clustering for unsupervised image classification and segmentation", 2019, p. 9865-9874, Proceedings of the IEEE International Conference on Computer Vision.

Yang Xu et al. "Deep spectral clustering using dual Autoencoder network", 2019, p. 4066-4075, Proceedings of the IEEE Conference on Computer Vision and Pattern Recognition.

Jianlong Wu et al. "Deep comprehensive correlation mining for image clustering",2019, p. 8150-8159 Proceedings of the IEEE International Conference on Computer Vision.

The World Intellectual Property Organization (WIPO) International Search Report for PCT/CN2021/102530 Sep. 27, 2021 7 Pages (including translation).

The European Patent Office (EPO) The Extended European Search Report for 21853462.6 Jul. 13, 2023 13 Pages (including translation).

Junjie Zhao et al:"Deep Image Clustering with Category-Style Representation", arxiv.org Cornell University Library, 201 Olin Library Cornell University Ithaca, NY 14853, Jul. 20, 2020.

Dmitry Molchanov et al:"Greedy Policy Search: A Simple Baseline for Learnable Test-Time Augmentation", arxiv.org Cornell University Library 201 Olin Library Cornell University Ithaca, NY 14853, Jun. 20, 2020.

Alex Krizhevsky et al:"ImageNet classification with deep convolutional neural networks", Advances in neural information processing systems (NIPS), Jan. 1, 2012, pp. 1-9.

Philip Bachman, et al., "Learning Representations by Maximizing Mutual Information Across Views", arxiv.org Cornell University Library, 201 Olin Library Cornell University Ithaca, NY 14853, Jun. 3, 2019.

* cited by examiner

IMAGE CLASSIFICATION MODEL TRAINING METHOD AND APPARATUS, COMPUTER DEVICE, AND STORAGE MEDIUM

CROSS-REFERENCES TO RELATED APPLICATIONS

This application is a continuation application of PCT Patent Application No. PCT/CN2021/102530, entitled "IMAGE CLASSIFICATION MODEL TRAINING METHOD AND APPARATUS, COMPUTER DEVICE, AND STORAGE MEDIUM" and filed on Jun. 25, 2021, which claims priority to Chinese Patent Application No. 202010781930.0, filed on Aug. 6, 2020, the entire contents of both of which are incorporated herein by reference.

FIELD OF THE TECHNOLOGY

The present disclosure relates to the field of image processing technologies, and in particular, to an image classification model training method and apparatus, a computer device, and a storage medium.

BACKGROUND OF THE DISCLOSURE

Artificial intelligence-based image classification technology can be based on a specific standard, for example, the similarity between images. An image set is divided into different classes or clusters, so that images in the same cluster are as similar as possible. In addition, images not in the same cluster are also as different as possible.

In a current image classification method, image features are usually first extracted by a neural network, and then a classification module is configured to classify images based on the image features. The image classification method is distributed, that is, an image feature extraction process and an image classification process are independent of each other, and the calculation complexity is high. Therefore, there is no effective solution for how to lower the calculation complexity to reduce the resource consumption of the model and improve the classification efficiency.

SUMMARY

Embodiments of the present disclosure provide an image classification model training method and apparatus, a computer device, and a storage medium, which can train an image classification model with a simplified structure.

An embodiment of the present disclosure provides an image classification model training method, applied to a computer device, the method including: separately performing image transformation on at least two first images to obtain a plurality of second images, each first image corresponding to at least two second images of the plurality of second images; inputting the at least two first images and the corresponding second images into an image classification model, and outputting, by the image classification model, classification results of the at least two first images and classification results of the corresponding second images; in response to the classification results of the at least two first images and the classification results of the corresponding second images not meeting a reference condition, generating reference classification results of the at least two first images based on the classification results of the corresponding second images, the reference classification results of the first images being configured to represent probabilities that the first images and the corresponding at least two second images belong to each class; determining a total error value based on an error value between the classification results of the at least two first images and the reference classification results of the at least two first images, and an error value between the classification results of the second images corresponding to the at least two first images and the reference classification results of the at least two first images; and updating a parameter of the image classification model based on the total error value, and determining that training is completed when the classification results of the at least two first images and the classification results of the corresponding second images obtained by an updated image classification model meet the reference condition.

An embodiment of the present disclosure provides an image classification model training apparatus, including: an image obtaining module, configured to separately perform image transformation on at least two first images to obtain a plurality of second images, each first image corresponding to at least two second images of the plurality of second images; a classification module, configured to input the at least two first images and corresponding second images into an image classification model, and output, by the image classification model, classification results of the at least two first images and classification results of the corresponding second images; a result obtaining module, configured to generate, in response to the classification results of the at least two first images and the classification results of the corresponding second images not meeting a reference condition, reference classification results of the at least two first images based on the classification results of the corresponding second images, where the reference classification results of the first images are configured to represent probabilities that the first images and the corresponding at least two second images belong to each class; an error determining module, configured to determine a total error value based on an error value between the classification results of the at least two first images and the reference classification results of the at least two first images, and an error value between the classification results of the second images corresponding to the at least two first images and the reference classification results of the at least two first images; and a parameter update module, configured to update a parameter of the image classification model based on the total error value, and determine that training is completed when the classification results of the at least two first images and the classification results of the corresponding second images obtained by an updated image classification model meet the reference condition.

An embodiment of the present disclosure provides a computer device, the computer device including one or more processors and one or more memories, the one or more memories storing at least one piece of program code, the at least one piece of program code being loaded and executed by the one or more processors to implement operations performed by the image classification model training method.

An embodiment of the present disclosure provides a non-transitory computer-readable storage medium, the computer-readable storage medium storing at least one piece of program code, and the at least one piece of program code being loaded and executed by the processor to implement operations performed by the image classification model training method.

An embodiment of the present disclosure provides a computer program product, the computer program product including at least one piece of program code, the at least one piece of program code being stored in a computer-readable storage medium. A processor of a computer device reads the at least one piece of program code from the computer-readable storage medium, and the processor executes the at least one piece of program code, to cause the computer device to implement operations performed by the image classification model training method.

In a technical solution provided in an embodiment of the present disclosure, classification results of each image outputted by an image classification model are obtained, a reference classification result is constructed based on the classification result outputted by the image classification model when the classification results outputted by the image classification model do not meet a reference condition. Because the reference classification result can indicate a probability that images belong to each class, a parameter of the image classification model is updated to obtain a trained image classification model based on a total error value between the classification results of the each image and the reference classification result. The trained image classification model can directly output image classification results with higher accuracy based on an input image, thereby lowering the complexity of an image classification process of the image classification model.

DESCRIPTION OF EMBODIMENTS

To make the objectives, technical solutions, and advantages of the present disclosure clearer, the following further describes implementations of the present disclosure in detail with reference to the accompanying drawings. Obviously, the described embodiments are a part rather than all the embodiments of the present disclosure. All other embodiments obtained by a person skilled in the art based on the embodiments of the present disclosure without creative efforts shall fall within the protection scope of the present disclosure.

The terms "first", "second", and the like in the present disclosure are used for distinguishing between same items or similar items of which effects and functions are basically the same. It is to be understood that, the "first", "second", and "nth" do not have a dependency relationship in logic or time sequence, and a quantity and an execution order thereof are not limited.

In the present disclosure, an image classification model constructed based on a neural network is trained so that the image classification model can implement end-to-end image classification. That is, there is no need to apply an additional classification algorithm for image classification based on output image classification results between images.

The image classification model trained by using the image classification model training method provided in this embodiment of the present disclosure can be configured to classify and organize images stored in an electronic album, so as to facilitate the management of the images in the electronic album. In addition, the trained image classification model can further automatically classify pictures in a recommendation system or a network gallery, so that a recommendation time can be reached. Alternatively, the trained image classification model can recommend pictures that the user may be interested in according to the user's preference when the user searches for a picture, so as to implement accurate recommendation; and in addition, the image classification model trained by using the image classification model training method provided in this embodiment of the present disclosure can further be used in the medical field, for example, auxiliary recognition of medical images can be performed. An imaging region that is focused can be recognized from medical images by using the trained image classification model, such as a target blood vessel region, a target organ region, or the like, thereby improving the diagnostic efficiency.

Figure 1:
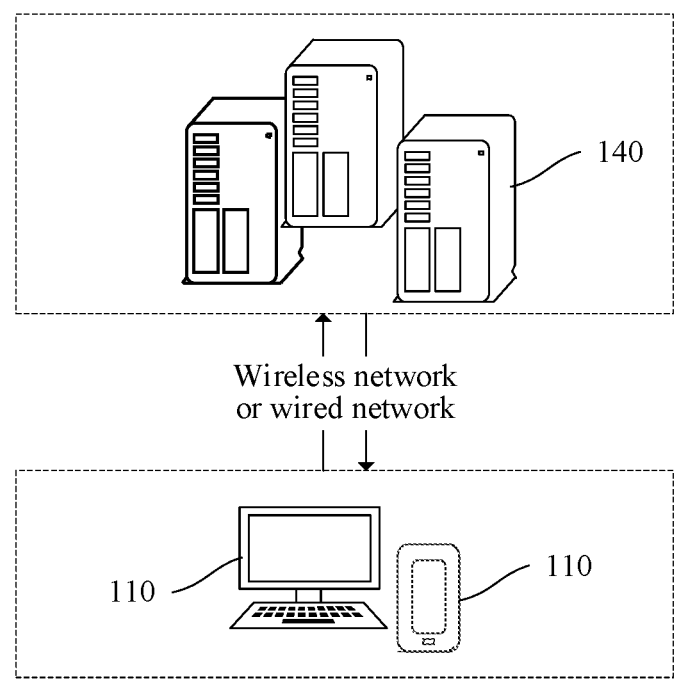
FIG. 1 is a schematic diagram of an implementation environment of an image classification model training method according to an embodiment of the present disclosure.

FIG. 1 is a schematic diagram of an implementation environment of an image classification model training method according to an embodiment of the present disclosure. The implementation environment includes a terminal 110 and an image classification platform 140.

The terminal 110 may be a smart phone, a tablet computer, a notebook computer, a desktop computer, a smart speaker, a smart watch, an in-vehicle terminal, or the like, but is not limited thereto. An application that supports image classification is installed and run on the terminal 110. The application may be an image recognition application, an image retrieval application, or the like. For example, the terminal 110 may be a user-side device or a development-side device, and the application running on the terminal 110 logs in to a user account. The terminal 110 may generally refer to one of a plurality of terminals. In this embodiment of the present disclosure, the terminal 110 is merely used as an example for description.

The image classification platform 140 is configured to provide a background service for the application that supports image classification. The image classification platform 140 undertakes main image classification work, and the terminal 110 undertakes secondary image classification work; or, the image classification platform 140 undertakes secondary image classification work, and the terminal 110 undertakes main image classification work; or, the image classification platform 140 or the terminal 110 may separately undertake image classification work. In some embodiments, the image classification platform 140 includes: an access server, an image classification server, and a database. The access server is configured to provide an access service for the terminal 110. The image classification server is used for providing a background service related to image classification. There may be one or more image classification servers. When there are a plurality of image classification servers, at least two image classification servers are configured to provide different services, and/or at least two image classification servers are configured to provide the same service, for example, provide the same service in a load balancing manner, which is not limited in this embodiment of the present disclosure. An image classification model can be set in the image classification server, and the image classification server provides support for the training and application process of the model. The server may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform.

The terminal 110 and the image classification platform 140 may be directly or indirectly connected in a wired or wireless communication manner, which is not limited in this embodiment of the present disclosure.

A person skilled in the art may learn that there may be more or fewer terminals. For example, there may be only one terminal, or there may be dozens of hundreds of terminals or more. The quantity and the device type of the terminals are not limited in the embodiments of the present disclosure.

This embodiment of the present disclosure provides an image classification model training method. In the method, data enhancement is firstly performed on an image used for model training, and an initial image and the image after data enhancement are jointly inputted into the image classification model. An image classification result is outputted by the image classification model, and then a reference classification result is constructed based on the image classification result. Because the reference classification result can be configured to indicate a probability that images belong to each class, a total error value between the classification results of each image and the reference classification result is obtained. The total error value is back-propagated to the image classification model, and parameters of each computing layer in the image classification model are adjusted to obtain a trained image classification model, so that the image classification model can implement end-to-end image classification. That is, accurate image classification results can be directly outputted based on images by using the image classification model, thereby lowering the complexity of image classification.

Figure 2:
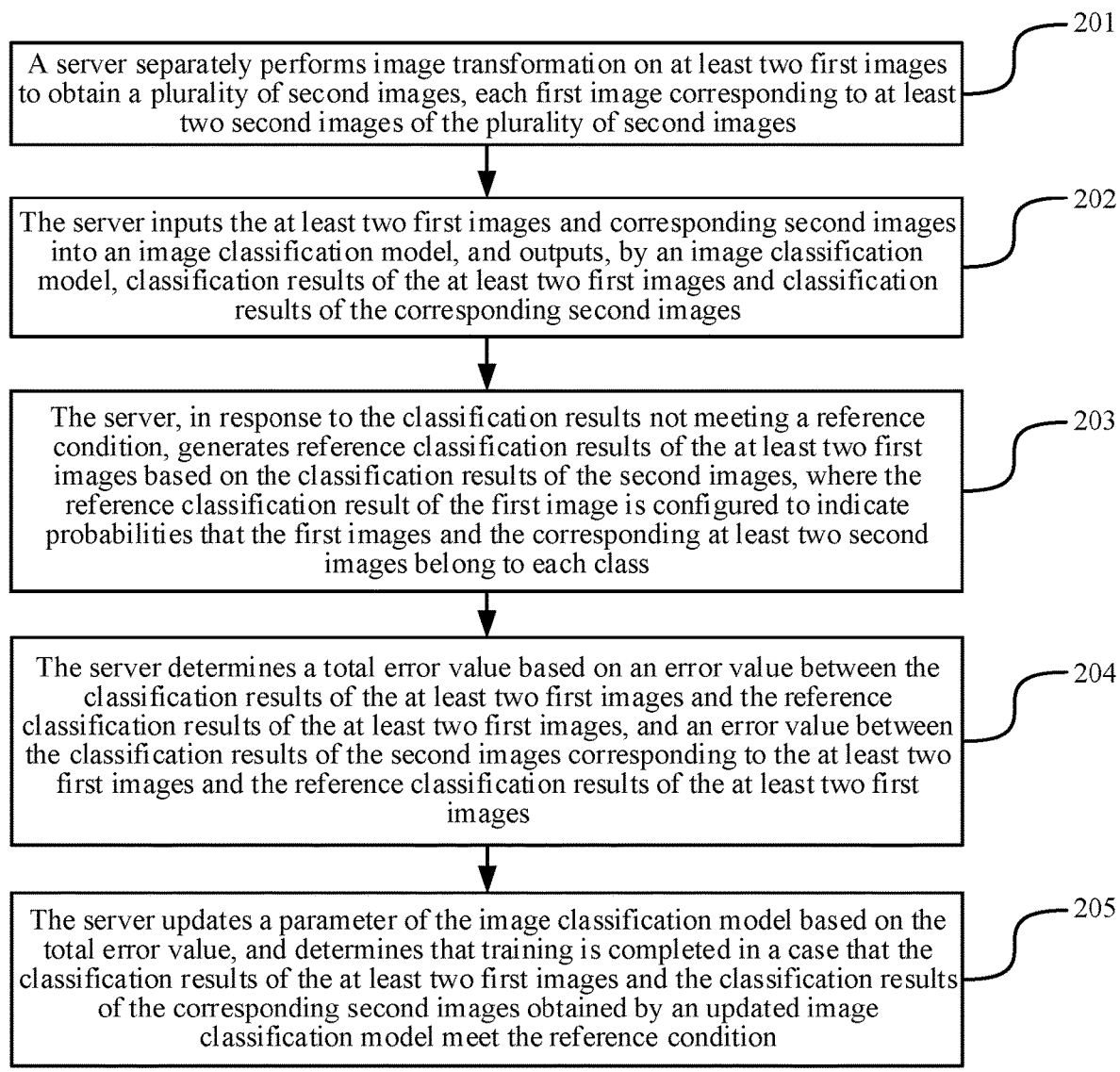
FIG. 2 is a flowchart of an image classification model training method according to an embodiment of the present disclosure.

FIG. 2 is a flowchart of an image classification model training method according to an embodiment of the present disclosure. The method can be applied to a computer device. The computer device may be the terminal or the server. In this embodiment of the present disclosure, the server is used as an execution entity to introduce the image classification model training method. Referring to FIG. 2, this embodiment may include the following steps:

201. The server separately performs image transformation on at least two first images to obtain a plurality of second images, each first image corresponding to at least two second images of the plurality of second images.

The first image may be an image stored in the server, an image captured by the server from a video, or an image captured by a device with an image capturing function. For example, the camera transmits the captured image to the server in real time. This embodiment of the present disclosure sets no limitation on a specific image. The first image performs data enhancement on the second image, that is, the second image is obtained by image transformation. The image transformation manner includes image cropping, image flipping, image color dithering, and image color channel reorganizing, but is not limited thereto.

In in one embodiment, the server obtains at least two first images in response to a model training instruction transmitted by the terminal. The terminal may be a terminal used by a developer, and the terminal transmits the model training instruction to the server in response to a user operation. A trigger manner of the model training instruction is not limited in this embodiment of the present disclosure. After obtaining at least two first images, the server performs image transformation on the at least two first images based on at least one image transformation manner to obtain a plurality of second images, each first image corresponding to at least two second images of the plurality of second images.

202. The server inputs the at least two first images and corresponding second images into an image classification model, and outputs, by the image classification model, classification results of the at least two first images and classification results of the corresponding second images.

The image classification model is a model constructed based on a neural network. For example, the neural network is a Visual Geometry Group (VGG) deep convolutional neural network, a Residual Network (ResNet), or the like. The structure of the image classification model is not limited in this embodiment of the present disclosure.

In in one embodiment, after the server inputs the at least two first images and the at least two second images into the image classification model, at least one computing layer in the image classification model performs convolution operation on each image, extracts image features of the each image, and predicts image classification results corresponding to the each image based on the image features. The image classification result can be represented in the form of a class probability vector, and the image classification result corresponding to an image can be configured to represent the probability that an image belongs to each class. A process of performing image classification on the image classification model is not limited in this embodiment of the present disclosure.

203. The server, in response to the classification results not meeting a reference condition, generates reference classification results of the at least two first images based on the classification results of the corresponding second images, where the reference classification results of the first images are configured to represent probabilities that the first images and the corresponding at least two second images belong to each class.

The reference condition may be set by a developer, and the reference condition may be set such that mutual information between each image and the classification result is greater than a reference threshold, which is not limited in this embodiment of the present disclosure. The mutual information can indicate the strength of a correlation between two variables. The stronger the correlation, the greater the mutual information value. In this embodiment of the present disclosure, the mutual information between the each image and the classification result indicates a correlation between the image and the corresponding classification result.

In an embodiment of the present disclosure, the server, in response to the each image classification result not meeting a reference condition, constructs a reference classification result based on the classification results of the at least two second images corresponding to the each first image, and then performs a subsequent model parameter adjustment process based on the reference classification result. In the embodiments of the present disclosure, because the reference classification result is obtained based on the second images, that is, the classification results of the images after data enhancement, subsequent model training steps are performed based on the reference classification result, so that an output result of the image classification model can have data enhancement invariance. That is, the at least two second images obtained by being performed data enhancement by the same first image both belong to a same class.

In some embodiments, the server, in response to the classification results meeting the reference condition, determines that training of the image classification model is completed.

204. The server determines a total error value based on an error value between the classification results of the at least two first images and the reference classification results of the at least two first images, and an error value between the classification results of the second images corresponding to the at least two first images and the reference classification results of the at least two first images.

The total error value is configured to represent the accuracy of the output result of the image classification model, and the higher the accuracy, the smaller the total error value. In in one embodiment, the server separately obtains an error value between each image and the corresponding classification result, obtains an error value between the classification results of the first images and the classification results of the second images, and obtains the total error value based on the two types of error values. The foregoing description of the method for obtaining the total error value is merely an example description. This embodiment of the present disclosure sets no limitation on a method for obtaining the total error value.

205. The server updates a parameter of the image classification model based on the total error value, and determines that training is completed when the outputted classification results of the at least two first images and the outputted classification results of the corresponding second images obtained by an updated image classification model meet the reference condition.

In in one embodiment, after obtaining the total error value, the server back-propagates the total error value to the image classification model. Based on a gradient descent algorithm, the parameter of each computing layer in the image classification model is solved until the classification results obtained by using the image classification model meets the reference condition, and it is determined that the training of the image classification model is completed. This embodiment of the present disclosure sets no limitation on a specific method for updating a parameter of the image classification model.

In a technical solution provided in an embodiment of the present disclosure, classification results of each image outputted by an image classification model are obtained. When the classification results outputted by the image classification model do not meet a reference condition, a reference classification result is constructed based on the classification result outputted by the image classification model. Because the reference classification result can indicate probability that an image belongs to each class, a parameter of the image classification model is updated to obtain a trained image classification model based on a total error value between the classification result of each image and the reference classification result. The trained image classification model can directly output image classification results with higher accuracy based on an input image, thereby reducing the complexity of an image classification process of the image classification model.

Figure 3:
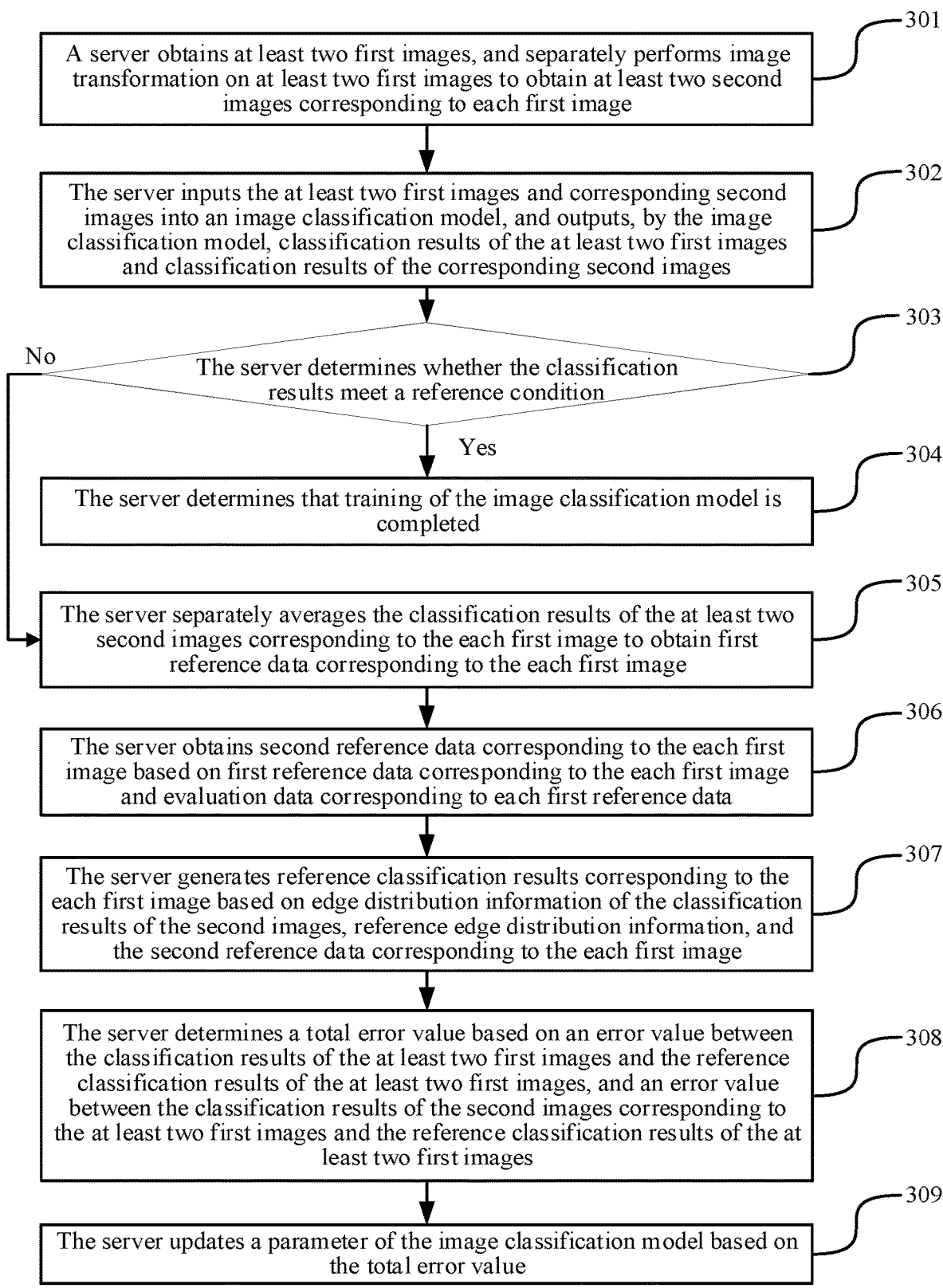
FIG. 3 is a flowchart of an image classification model training method according to an embodiment of the present disclosure.

FIG. 3 is a flowchart of an image classification model training method according to an embodiment of the present disclosure. With reference to FIG. 3, the image classification model training process is described.

301. The server obtains at least two first images, and separately performs image transformation on at least two first images to obtain a plurality of second images, each first image corresponding to at least two second images of the plurality of second images.

The second image is obtained by being performed image transformation by the first image, that is, the second image is an image after data enhancement. For example, the server, in response to a model training instruction, obtains at least two first images, separately performs image transformation on the at least two first images based on at least one of image cropping, image flipping, image color dithering, and image color channel reorganizing to obtain a plurality of second images, each first image corresponding to at least two second images of the plurality of second images. Description of the image transformation method, that is, the data enhancement method is merely an example description. This embodiment of the present disclosure sets no limitation on a specific method for performing data enhancement.

In this embodiment of the present disclosure, the quantity of the first images and the second images is not limited. For example, a batch size of model training can be set to 128, the server reads 128 first images during each model training, and after data enhancement is performed on any first image, corresponding M second images are obtained. M is a positive integer, and a value of M can be set by the developer. For example, M can be set to 10, and the value of M is not limited in this embodiment of the present disclosure.

In this embodiment of the present disclosure, both the first images and the second images are represented as a digital matrix composed of pixel values. That is, in the following steps, model training is performed based on the digital matrix representing the first image and the second image.

302. The server inputs the at least two first images and corresponding second images into an image classification model, and outputs, by the image classification model, classification results of the at least two first images and classification results of the corresponding second images.

The image classification model can cluster each first image and each second image. That is, the each image is divided into different clusters according to different features reflected by the each image, and at least one image in a same cluster belongs to a same class.

Figure 4:
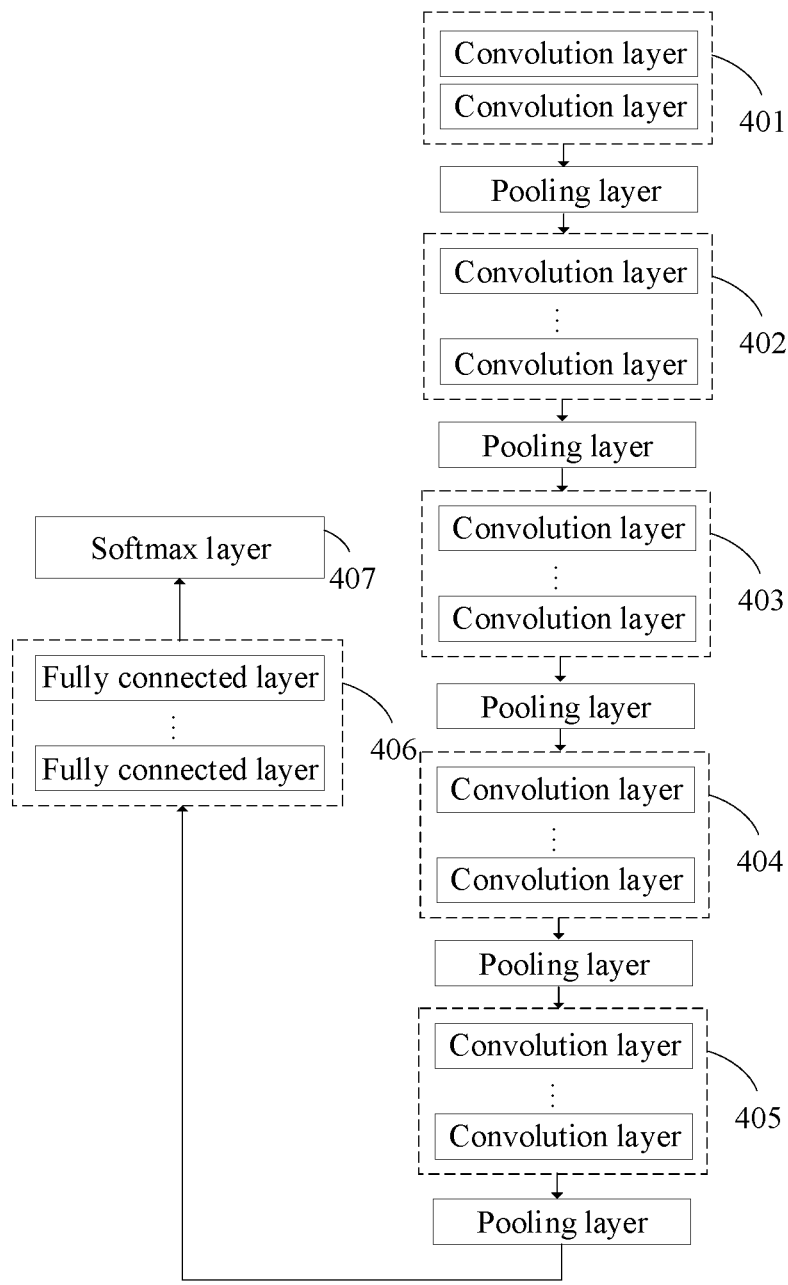
FIG. 4 is a schematic structural diagram of an image classification model according to an embodiment of the present disclosure.

The image classification model is a model constructed based on a convolutional neural network. In this embodiment of the present disclosure, the image classification model is described by using a model constructed based on the VGG deep convolutional neural network as an example. FIG. 4 is a schematic structural diagram of an image classification model according to an embodiment of the present disclosure. As shown in FIG. 4, the image classification model includes 5 convolution units, that is, a convolution unit 401, a convolution unit 402, a convolution unit 403, a convolution unit 404, and a convolution unit 405. Each convolution unit includes at least one convolution layer, and the each convolution unit is connected to a pooling layer; and the image classification model further includes at least one fully connected layer 406 and a softmax (normalized exponential function) layer 407. Certainly, the image classification model may further include other units, such as an input unit, an output unit, or the like, which are not limited in this embodiment of the present disclosure. In the embodiments of the present disclosure, using the image classification model shown in FIG. 4 as an example to describe an image classification process, in in one embodiment, the server inputs at least two first images and at least two second images into the image classification model. The convolution operation is separately performed on each image by each convolution unit in the image classification model to extract image features of the each image. The image features extracted by the each convolution unit are downsampled through a pooling layer, so as to perform dimensionality reduction on the image features, and reduce data processing amount in a subsequent calculation process. After the features are extracted, the image features of the each image are mapped to vectors through at least one fully connected layer. Finally, each element in the vector outputted by a last fully connected layer is mapped to an interval of [0,1] through the softmax layer to obtain the classification results corresponding to the each image, that is, a class probability vector, and an element in the class probability vector indicates the probability that the image belongs to a class.

In in one embodiment, the server can input the first image and the second image of any size into the image classification model, or adjust a size of the first image and a size of the second image to a reference size and then input the first image and the second image into the image classification model. For example, before inputting the first image and the second image into the image classification model, the server scales the each first image and the each second image according to an actual case, so as to adjust the each first image and the each second image to the reference size. The reference size may be set by the developer, which is not limited in this embodiment of the present disclosure.

Description of the image classification method is merely an example description. This embodiment of the present disclosure sets no limitation on a specific image classification method. This embodiment of the present disclosure also sets no limitation on the structure of the image classification model.

303. The server determines whether the classification results meet the reference condition.

The reference condition is used for measuring whether the image classification model converges. In in one embodiment, it can be determined whether the classification result meets the reference condition based on the mutual information, and whether to continue the training of the image classification model. The reference condition may be set by the developer, which is not limited in this embodiment of the present disclosure. In in one embodiment, a manner in which the server determines whether the classification results meet the reference condition includes any one of the following plurality of implementations.

Implementation 1. In in one embodiment, the reference condition includes a data restriction condition on the first mutual information and the second mutual information. The first mutual information indicates a correlation between the each first image and the corresponding classification results, and the stronger the correlation, the greater the value of the first mutual information; and the second mutual information indicates a correlation between the classification results of the each first image and the classification results of the corresponding second images, that is, the correlation between the classification results of the images before the data enhancement and the classification results of the images after the data enhancement. The stronger the correlation, the greater the value of the second mutual information. That is, the classification result corresponding to the images before the data enhancement is the same as the classification results corresponding to the images after the data enhancement, that is, the image classification results have data enhancement invariance. In in one embodiment, the server obtains first mutual information between the each first image and the classification results of the each first image. For example, the server separately obtains first sub mutual information between the each first image and the corresponding classification result, and averages a sum of the each first sub mutual information as the first mutual information. The server obtains the second mutual information between the classification result of the each first image and the classification result of the corresponding second image. For example, the server separately obtains the second sub mutual information between the classification results of the each first image and the classification results of the corresponding each second image, and averages a sum of the each second sub mutual information as the second mutual information. If the first mutual information is greater than or equal to a first threshold and the second mutual information is greater than or equal to a second threshold, it is determined that the first mutual information and the second mutual information meet the reference condition, that is, the classification results meet the reference condition; and otherwise, it is determined that the first mutual information and the second mutual information do not meet the reference condition, that is, the classification results does not meet the reference condition. The first threshold and the second threshold may be set by the developer, which is not limited in this embodiment of the present disclosure. The foregoing description of the method for obtaining the first mutual information and the second mutual information is merely an example description. This embodiment of the present disclosure sets no limitation on a specific method for obtaining the first mutual information and the second mutual information.

Implementation 2. In in one embodiment, the reference condition includes a data restriction condition on the third mutual information. The third mutual information indicates the accuracy of an output result of the image classification model, and the value of the third mutual information is positively correlated to the accuracy of the output result of the image classification model. For example, the sum of the first mutual information and the second mutual information is determined as the third mutual information. In in one embodiment, the server determines the third mutual information based on the first mutual information and the second mutual information. If the third mutual information is greater than or equal to a third threshold, it is determined that the third mutual information meets the reference condition, that is, it is determined that the classification results meet the reference condition; and if the third mutual information is less than the reference threshold, it is determined that the third mutual information does not meet the reference condition, that is, it is determined that the classification results does not meet the reference condition. The third threshold is set by the developer, which is not limited in this embodiment of the present disclosure. In in one embodiment, the method for determining the third mutual information can be represented as the following formula (1):

$$I=I(x,y)+I(y,\hat{y}) \qquad (1),$$

where x represents the first image, y represents the classification result of the first image, ŷ represents the classification result of the second image, I(x,y) I(x,y) represents the first mutual information, I(y,ŷ) represents the second mutual information, and I represents the third mutual information.

Implementation 3. In in one embodiment, the reference condition includes a first restriction condition on the first mutual information and the second mutual information and a second restriction condition on the quantity of model training times. For example, the reference condition may be set such that both the first mutual information and the second mutual information obtained in this model training process meet the data restriction condition, and the quantity of model training times is greater than a count threshold. The reference condition may also be set such that both the first mutual information and the second mutual information obtained in this model training process meet the data restriction condition, and the quantity of model training times for which both the first mutual information and the second mutual information meet the data restriction condition is greater than the count threshold. The reference condition may further be set such that both the first mutual information and the second mutual information obtained in this model training process meet the data restriction condition, and the first mutual information and the second mutual information obtained in each model training process present a trend of convergence. Certainly, the reference condition may further be set to other content. This is not limited in this embodiment of the present disclosure. In in one embodiment, if the first mutual information and the second mutual information meet the first restriction condition, and the quantity of model training times meets the second restriction condition, it is determined that the classification results meet the reference condition; and otherwise, it is determined that the classification results does not meet the reference condition.

The foregoing description of determining whether the classification results meet the reference condition is merely an example description. This embodiment of the present disclosure sets no limitation on a specific method for determining whether the classification results obtained in the this model training process meets the reference condition.

In the embodiments of the present disclosure, if the classification results meet the reference condition, the server performs the following step 304; and if the classification results does not meet the reference condition, the server performs the following step 305 to step 309.

304. The server, in response to the classification results meeting the reference condition, determines that training of the image classification model is completed.

In in one embodiment, if the classification results meet the reference condition, that is, the image classification model converges, the server determines that the training of the image classification model is completed to obtain the each parameter in the trained image classification model.

In this embodiment of the present disclosure, only one training process is used as an example for description, and the quantity of training times of the image classification model is not limited in this embodiment of the present disclosure. For example, when the image classification model is trained a plurality of times, in in one embodiment, if the classification results meet the reference condition, and the quantity of training times is greater than or equal to a training count threshold, it is determined that the training of the image classification model is completed; and if the classification results meet the reference condition, but the quantity of training times is less than the training count threshold, a next batch of training data continues being read to train the image classification model.

305. The server, in response to the classification results not meeting the reference condition, separately averages the classification results of the at least two second images corresponding to the each first image to obtain first reference data corresponding to the each first image.

In in one embodiment, the server obtains the first reference data corresponding to the each first image based on an average value of the classification results of the images after the data enhancement, that is, the average value of the classification results of the second images. The first reference data integrates features of the classification results of the images after the data enhancement. A data reference result determined based on the first reference data can also integrate the features of the classification results of the images after the data enhancement. After the parameter of the image classification model is updated based on the reference classification result, the output result of the image classification model can have data enhancement invariance. That is, at least two second images obtained by being performed data enhancement by the same first image belong to the same class.

In in one embodiment, the first reference data can be determined by formula (2):

$$q_i = \frac{1}{M}\sum_{m=1}^{M} p_\theta(y \mid x = \hat{x}_{i,m}), \qquad (2)$$

where i represents a sequence number of the first image; $q_i$ represents the first reference data corresponding to the $i^{th}$ first image; M represents a total quantity of the second images corresponding to the $i^{th}$ first image, and m represents a sequence number of the second image; $x=\hat{x}_{i,m}$ represents the $m^{th}$ second image corresponding to the $i^{th}$ first image; and $p_\theta(y|x=\hat{x}_{i,m})$ represents the classification result corresponding to the second image $\hat{x}_{i,m}$. The foregoing description of the method for obtaining the first reference data is merely an example description. This embodiment of the present disclosure sets no limitation on a specific method for obtaining the first reference data.

306. The server obtains second reference data corresponding to the each first image based on first reference data corresponding to the each first image and evaluation data corresponding to each first reference data.

The evaluation data of the first reference data indicates the accuracy of the first reference data. In in one embodiment, the evaluation data may be represented as a vector composed of two elements, one element indicates a probability that the first reference data is accurate, and an other element indicates a probability that the first reference data is inaccurate. For example, if the evaluation data is represented as (0, 1), then the evaluation data indicates that the probability that the first reference data is accurate is 1, that is, the first evaluation data is accurate; and the evaluation data can also be represented as (0.3, 0.7), then the probability that the evaluation data indicates that the first data is inaccurate is 0.3, and the probability that the first reference data is accurate is 0.7. The evaluation data may also be represented in other forms, which are not limited in this embodiment of the present disclosure.

In in one embodiment, the evaluation data corresponding to the each first reference data is generated by an evaluator based on the each first reference data, where the evaluator is configured to determine the accuracy of the first reference data. In in one embodiment, the evaluator is a deep neural network composed of at least one fully connected layer, and the quantity of fully connected layers in the evaluator can be set by the developer, which is not limited in this embodiment of the present disclosure.

In the embodiments of the present disclosure, the evaluator can be trained based on the each first reference data and reference distribution information of the each first reference data. The reference distribution information of the first reference data indicates the reference value of each element in the first reference data. The reference distribution information can be sampled from prior distribution information corresponding to the first reference data, that is, the reference distribution information $\tilde{q}_i$ of the $i^{th}$ first image is a one-hot vector sampled from prior distribution information p(q). The prior distribution information p(q) can be set by the developer, which is not limited in this embodiment of the present disclosure, and the probability that each one-hot vector is sampled in the prior distribution information p(q) is equal. In in one embodiment, the first reference data and the reference distribution information of the first reference data can be separately inputted into the evaluator, a loss function is applied to determine an evaluation error value of the output result of the evaluator, and the parameter of each fully connected layer in the evaluator is updated based on the evaluation error value. In in one embodiment, the method for obtaining the evaluation error value can be represented as the following formula (3):

$$L_{Adv}^{C} = \frac{1}{B}\sum_{i=1}^{B}\left(C_w(q_i) - C_w(\tilde{q}_i) + \lambda(\|\nabla_{\hat{q}_i} C_w(\hat{q}_i)\|_2 - 1)^2\right), \quad (3)$$

where
$L_{Adv}^{C}$, represents the evaluation error value; B represents the image, and i represents a sequence number of the first image; $q_i$ represents the first reference data of the first image whose sequence number is i, $C_w(q_i)$ represents an output result when an input by the evaluator is $q_i$, and $C_w(\tilde{q}_i)$ represents an output result when an input by the evaluator is $\tilde{q}_i$; $(\|\nabla_{\hat{q}_i} C_w(\hat{q}_i)\|_2 - 1)^2$ represents a gradient penalty term, used for causing the evaluator $C_w$ to meet a Lipschitz constraint, and $\lambda$ represents a gradient penalty term coefficient; $\hat{q}_i$ represents a vector sampled on a line connecting $q_i$ and $\tilde{q}_i$. In in one embodiment, in each image classification model training process, the evaluator can be trained a plurality of times, and the evaluator obtained in the last training process is obtained as the trained evaluator. Each first reference data $q_i$ is inputted into the trained evaluator $C_w$ to obtain evaluation data $C_w(q_i)$ corresponding to the each first reference data. The quantity of training times of the evaluator can be set by the developer. For example, in each image classification model training process, the quantity of training times of the evaluator is set to 5, which is not limited in this embodiment of the present disclosure. The foregoing description of the evaluator training method is merely an example description, and the evaluator training method is not limited in this embodiment of the present disclosure. In the embodiments of the present disclosure, in a process of training the evaluator, the evaluation error value $L_{Adv}^{C}$, gradually decreases, which can cause a Wasserstein distance between a probability distribution p(q) of the first reference data and the prior distribution information p($\tilde{q}$) to be gradually reduced, that is, to cause the probability distribution p(q) of the first reference data to gradually approach the prior distribution information p($\tilde{q}$).

In in one embodiment, after obtaining the evaluation data corresponding to the each first reference data, the server can average the evaluation data corresponding to the each first reference data to obtain average evaluation data; and separately adjust the each first reference data based on a gradient of the average evaluation data to obtain the second reference data corresponding to the each first image. The method for obtaining the second reference data can be represented as the following formula (4) and formula (5):

$$L_{Adv} = \frac{1}{B}\sum_{i=1}^{B} C_w(q_i); \text{ and} \quad (4)$$

$$q_i \leftarrow \text{Normalize}\left(q_i - \frac{\alpha\|q_i\|_2}{\|\nabla_{q_i} L_{Adv}\|_2}\nabla_{q_i} L_{Adv}\right), \quad (5)$$

where
B represents the quantity of the first image, and i represents a sequence number of the first image; $q_i$ represents the first reference data of the first image whose sequence number is i; $C_w(q_i)$ represents the evaluation data of the first reference data $q_i$; $L_{Adv}$ represents the average evaluation data; $\hat{q}_i$ represents the second reference data of the first image whose sequence number is i; Normalize ( ) represents a normalization processing, and a method for performing the normalization processing is not limited in this embodiment of the present disclosure; $\alpha$ is a hyperparameter, used for controlling a magnitude of a gradient, and a value of a is set by the developer. For example, the value can be set to 0.04, which is not limited in this embodiment of the present disclosure; and $\nabla_{q_i} L_{Adv}$ represents a gradient of $L_{Adv}$.

The foregoing description of the method for obtaining the second reference data is merely an example description. This embodiment of the present disclosure sets no limitation on a specific method for obtaining the second reference data. For example, a label sharpen method can further be used for obtaining the second reference data based on the first reference data, and the method can be represented as the following formula (6):

$$q_i = \text{Normalize}(q_i^{1/T}) \quad (6),$$

where
$q_i$ represents the first reference data of the first image whose sequence number is i, $\hat{q}_i$ of the first image whose sequence number is i represents the second reference data, T is a hyperparameter, a value range is (0, 1), a value of T is set by the developer, and Normalize ( ) represents normalization processing.

In the embodiments of the present disclosure, because the reference distribution information of the first reference data is represented in the form of a one-hot vector, in the model training process, the reference distribution information is used for training the evaluator. Then, the image classification model is trained based on the trained evaluator, so that the first reference data can gradually approach the form of the one-hot vector. That is, the image classification result increasingly approaches the form of the one-hot vector, which enhances the clarity of the image classification result, so that the each image classification result can correspond to a specified class. That is, a clustering class of each output image is determined when the image classification model performs a clustering task.

307. The server generates the reference classification results corresponding to the each first image based on edge distribution information of the classification results of the second images, reference edge distribution information, and the second reference data corresponding to the each first image.

The edge distribution information of the classification results indicates the class distribution condition in the classification results; and the reference edge distribution information may be set by the developer, which is not limited in this embodiment of the present disclosure. In this embodiment of the present disclosure, to ensure class balance of the classification results, that is, the probability that the each image is allocated to the each class is equal, each element in the reference edge distribution information can be set to a same value. That is, the reference edge distribution information is a vector composed of a same numerical value.

In in one embodiment, the server determines a weight vector based on the edge distribution information of the classification results of the second images and the reference edge distribution information; multiplies the second reference data corresponding to the each first image by an element corresponding to a same position in the weight vector to obtain the adjusted second reference data; and performs normalization processing on the adjusted second reference data to generate the reference classification result. The method for determining the reference classification result may be represented as the following formula (7):

$$\hat{q}'_i = \text{Noimalize}\left(\hat{q}_i \times \frac{\tilde{p}(y)}{\hat{p}_\theta(y)}\right), \tag{7}$$

where
$\hat{q}'_i$ represents the reference classification result of the first image whose sequence number is i; $\hat{q}_i$ represents the second reference data of the first image whose sequence number is i; $\hat{p}_\theta(y)$ represents the edge distribution information of the image classification result outputted by the image classification model; $\tilde{p}(y)$ represents the reference edge distribution information;

$$\frac{\tilde{p}(y)}{\hat{p}_\theta(y)}$$

represents a weight vector obtained by the edge distribution information of the classification result being divided by the reference edge distribution information; and Normalize ( ) represents normalization processing.

In in one embodiment, the edge distribution information of the classification results of the second images is determined based on the classification results of the each second image. When the image classification model is trained for the first time, the edge distribution information of the classification results of the second images can be determined based on the reference edge distribution information and the classification results of the each second image, which can be represented as the following formula (8):

$$\hat{p}_\theta(y) \leftarrow \gamma\tilde{p}(y) + \frac{(1-\gamma)}{BM}\sum_{i=1}^{B}\sum_{m=1}^{M} p_\theta(y\,|\,x = \hat{x}_{i,m}), \tag{8}$$

where
$\hat{p}_\theta(y)$ represents the edge distribution information of the classification results of the second images obtained during this model training process, and $\tilde{p}(y)$ represents the reference edge distribution information; i represents the sequence number of the first image, and m represents the sequence number of the second image; B represents the quantity of the first images, M represents the quantity of the second images corresponding to the each first image, and $\hat{x}_{i,m}$ represents the $m^{th}$ second image corresponding to the $i^{th}$ first image; and $\gamma$ represents a momentum coefficient, and a value of $\gamma$ can be set by the developer, which is not limited in this embodiment of the present disclosure.

In the embodiments of the present disclosure, in the model training process other than the model training for the first time, the edge distribution information of the classification results of the second images applied in this model training process can be determined based on the edge distribution information of the classification results of the second images obtained in the previous model training process, which can be represented as the following formula (9):

$$\hat{p}_\theta(y) \leftarrow \gamma\hat{p}_\theta(y) + \frac{(1-\gamma)}{BM}\sum_{i=1}^{B}\sum_{m=1}^{M} p_\theta(y\,|\,x = \hat{x}_{i,m}), \tag{9}$$

where
$\hat{p}_\theta(y)$ represents the edge distribution information of the classification results of the second images obtained in this model training process, and $\hat{p}_\theta(y)$ represents the edge distribution information of the classification results of the second images obtained in a previous model training process; B represents the quantity of the first images, and M represents the quantity of the second images corresponding to the each first image; i represents the sequence number of the first image, and m represents the sequence number of the second image; $\hat{x}_{i,m}$ represents the $m^{th}$ second image corresponding to the $i^{th}$ first image; and $\gamma$ represents a momentum coefficient, and a value of $\gamma$ can be set by the developer. For example, $\gamma$ can be set to 0.8, which is not limited in this embodiment of the present disclosure. In the embodiments of the present disclosure, when the quantity of images predicted as the $k^{th}$ class is small, the probability of the edge distribution information $\hat{p}_\theta(y=k)$ of the $k^{th}$ class is less than the prior probability $\tilde{p}(y=k)$, that is, the reference edge distribution information, so that the probability $q_{ik}$ that the images belong to the $k^{th}$ class is increased. By minimizing $L_{KL}$, that is, a loss function value of the image classification model, more pictures are predicted as the $k^{th}$ class. When the quantity of images in the $k^{th}$ class is large, the method also accordingly reduces the type of images. In this way, class balance is included in a clustering result.

In step 304 to step 307, it is determined that the training of the image classification model is completed in response to the classification results meeting the reference condition. Otherwise, reference classification results of the at least two first images are generated based on the classification results of the at least two second images corresponding to the each first image, where the reference classification result of the first image is configured to represent probabilities that the first image and the corresponding at least two second images belong to each class. In the process of obtaining the reference classification results, when the first reference data is determined, the image features of the images after data enhancement are integrated, which have the data enhancement invariance; the second reference data is close to the one-hot vector and has clarity; and then, the reference classification results are determined based on the first reference data, the second reference data, and the reference edge distribution information, and the reference classification results have class balance. The determined reference classification results can be integrated with data enhancement invariance, clarity, and class balance. The subsequent model parameter adjustment steps are performed based on the reference classification results, and an image classification model with better performance can be obtained.

308. The server determines a total error value based on an error value between the classification results of the at least two first images and the reference classification results of the at least two first images, and an error value between the classification results of the second images corresponding to the at least two first images and the reference classification results of the at least two first images.

In in one embodiment, the server obtains an error value between the image classification result and the reference classification result based on a KL loss function. For example, for one first image of the at least two first images, the server obtains a relative entropy between a reference classification result of the one first image and a classification result of the one first image as a first error value corresponding to the one first image; for the one first image, obtains a sum of a relative entropy of the reference classification result of the one first image and the classification result of the each second image corresponding to the one first image as a second error value of the one first image; and averages a sum of at least two first error values and at least two second error values to obtain the total error value. In in one embodiment, the method for obtaining the total error value can be represented as the following formula (10):

$$L_{KL} = \frac{1}{B(1+M)} \sum_{i=1}^{B} \left( KL(q_i \| p_\theta(y|x=x_i)) + \sum_{m=1}^{M} KL(q_i \| p_\theta(y|x=\hat{x}_{i,m})) \right), \quad (10)$$

where

KL(a∥b) represents to obtain a relative entropy between a and b; $p_\theta(y|x=x_i)$ represents an output result of the image classification model when an input is $x_i$, and $p_\theta(y|x=\hat{x}_{i,m})$ represents an output result of the image classification model when an input is $\hat{x}_{i,m}$; and $L_{KL}$ represents the total error value. The foregoing description of the method for obtaining the total error value is merely an example description. This embodiment of the present disclosure sets no limitation on a specific method for obtaining the total error value.

309. The server updates the parameter of the image classification model based on the total error value.

In in one embodiment, back propagation can be applied to update the parameter of the image classification model. For example, the server solves each parameter in the image classification model based on a gradient descent method of an Adaptive moment estimation (Adam) algorithm. It is determined that the image classification model training is completed until the classification results obtained by using the image classification model meets the reference condition. In some embodiments, the initial learning rate of the image classification model is set to 0.0005, and the parameters in the Adam algorithm are set to 0.5 and 0.9. A method for updating the parameter of the image classification model is not limited in this embodiment of the present disclosure.

In in one embodiment, after the server updates the parameter of the image classification model, if the quantity of training times reaches the count threshold, the server obtains the image classification model as the trained image classification model. If the quantity of training times does not reach the count threshold, the server can continue to read a next batch of training data from a training data set. The step 301 to step 309 are re-performed, and the image classification model is trained again until the trained image classification model is obtained.

In a technical solution provided in an embodiment of the present disclosure, classification results of each image outputted by an image classification model are obtained. When the classification results outputted by the image classification model do not meet a reference condition, a reference classification result is constructed based on the classification result outputted by the image classification model. Because the reference classification result can indicate probability that an image belongs to each class, a parameter of the image classification model is updated to obtain a trained image classification model based on a total error value between the classification result of each image and the reference classification result. The trained image classification model can directly output image classification results with higher accuracy based on an input image, thereby reducing the complexity of an image classification process of the image classification model.

Figure 5:
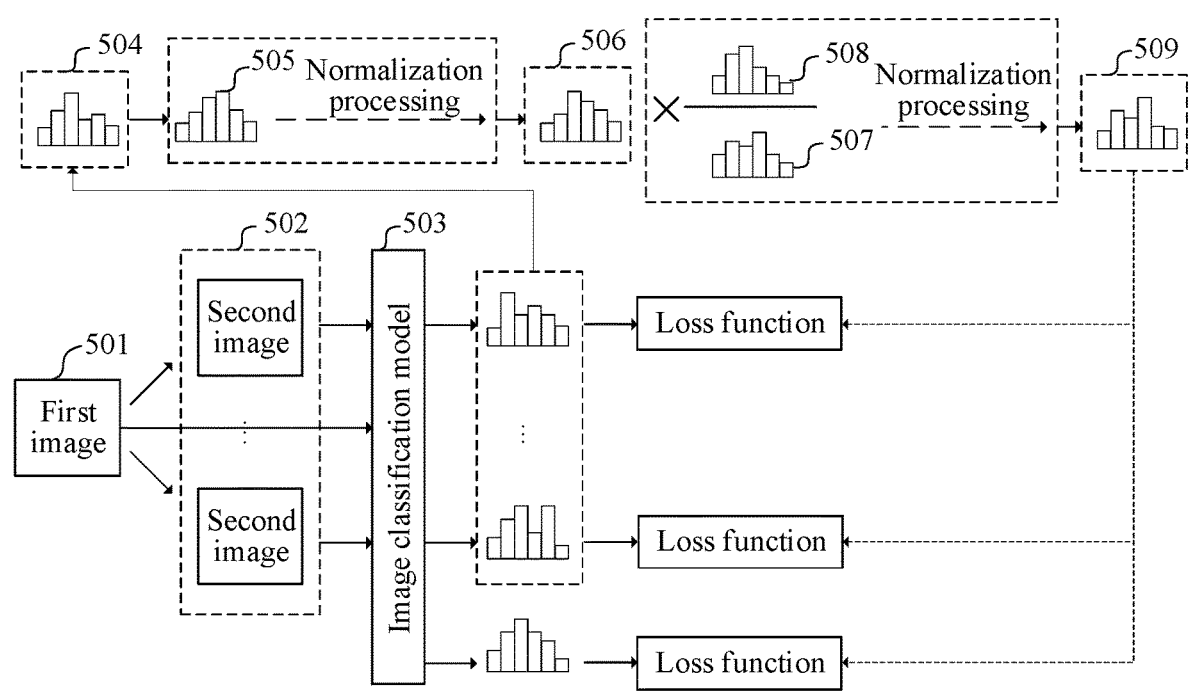
FIG. 5 is a schematic diagram of an image classification model training method according to an embodiment of the present disclosure.

FIG. 5 is a schematic diagram of an image classification model training method according to an embodiment of the present disclosure. With reference to FIG. 5, the image classification model training process is described. Using a first image as an example, first, the server performs data enhancement on a first image 501 to obtain at least two second images 502, inputs the first image 501 and the at least two second images 502 into an image classification model 503 to obtain classification results corresponding to each image; then, constructs first reference data 504 based on the image classification results corresponding to each second image, that is, performs the step 305; obtains second reference data 506 based on the first reference data 504 and evaluation data 505, that is, performs the step 306; then obtains a reference classification result 509 based on the second reference data 506, edge distribution information 507 of the classification results of the second images, and reference edge distribution information 508, that is, performs the step 307; and finally, applies a KL loss function to obtain a total error value between the classification results of the each image and the reference classification results 509, and updates the parameter of the image classification model 503 based on the total error value. In the embodiments of the present disclosure, the image classification model is optimized by constructing a reference classification result that integrates data enhancement invariance, clarity, and class balance, so that output of the image classification model tends to the reference classification result. That is, when performing an image clustering task, the image classification model directly outputs a clustering class of the image without additional clustering process, thereby improving the clustering performance of the model. In addition, the training data used in the image classification model training method provided in this embodiment of the present disclosure does not need to be labeled, so that the cost of labeling can be effectively saved, and can be widely used in pre-analysis of unknown data.

In this embodiment of the present disclosure, only using the training of the image classification model as an example for description, the technical solutions provided in this embodiment of the present disclosure can also be applied to training of other models, for example, a video classification model, a text recognition model, a speech classification model, or the like. That is, a model constructed based on a neural network such as a Recurrent Neural Network (RNN), a Long Short-Term Memory (LSTM), and a Bidirectional Encoder Representations from Transformers (BERT) can be cited, which is not limited in this embodiment of the present disclosure.

The foregoing embodiments introduce an image classification model training method, and the image classification model obtained by applying the image classification model training method can be applied to a plurality of types of applications and be in combination with a plurality of application scenarios. For example, the image classification model training method can be applied to an electronic album application or a cloud electronic album for classifying and organizing images. A small quantity of classes can be summarized from a large quantity of images by using the image classification model trained by the image classification model training method provided in this embodiment of the present disclosure. For example, images in the electronic album can be classified into classes such as scenery, character, food, or the like, and a representative image of each class can be obtained. The representative image of the each class can be used as a cover image of the each class, so that the user can quickly learn about information about the type of images through these representative images, and can implement quick search based on the class when the user needs to search for an image, thereby improving the efficiency of image search. The image classification model can further be applied to an image collection application, and the image classification model can be called to sort out images collected by the user, and classify the images into a plurality of classes without manual efforts. In the embodiments of the present disclosure, using the image classification model applied to the image collection application as an example for description, in in one embodiment, applying the image classification model for classifying images may include the following steps.

Step 1: The terminal transmits an image classification instruction to the server in response to an image classification operation.

The terminal is a terminal used by the user. The terminal installs and runs a target application for providing an image collection function, such as an electronic album. The server is a background server of the target application. The server is equipped with a trained image classification model, and the image classification model is obtained by applying the image classification model training method.

In in one embodiment, an image classification control is displayed in a target application run by the terminal, and the user selects at least two images from the collected images as to-be-classified target images. Using an electronic album application as an example, for example, the user can select at least two images captured within a certain period of time as the target images, or at least two images captured at a same location as the target images, or can further randomly select at least two images as the target images. This is not limited in this embodiment of the present disclosure. After selecting the target images, the user triggers the image classification control. The terminal, in response to a trigger operation performed by the user on the image classification control obtains image identifiers of each target image, generates an image classification instruction, and transmits the image classification instruction to the server. An image identifier is configured to uniquely designate an image, and the image classification instruction includes image identifiers of the each target image. The foregoing description of the method for generating the image classification instruction is merely an example description. This embodiment of the present disclosure sets no limitation on a specific method for generating the image classification instruction.

Step 2. The server, in response to the image classification instruction calls an image classification model to classify the target image indicated by the image classification instruction to obtain image classification results of the each target image.

In in one embodiment, the each image collected by the user is synchronously stored in the server. After receiving the image classification instruction, the server obtains at least two target images indicated by the at least two image identifiers based on the at least two image identifiers in the image classification instruction, and inputs the at least two target images into the image classification model.

In the embodiments of the present disclosure, using the image classification model constructed based on a VGG deep convolutional neural network as an example, a process of obtaining the image classification result of a target image is described. In in one embodiment, after the server inputs the target image into the image classification model, features are extracted from the target image through a plurality of cascaded convolution units in the image classification model. For example, for each convolution unit, a feature map outputted by a previous convolution unit is obtained, a convolution operation is performed on the feature map through at least one convolution layer to obtain a new feature map, and the new feature map is inputted into a next convolution unit. In in one embodiment, a pooling layer can be connected after each convolution unit to perform dimensionality reduction on the feature map output by the convolution unit. That is, a new feature map obtained by a convolution unit is first inputted into the pooling layer, and after the new feature map is performed dimension reduction processing by the pooling layer, the new feature map is then inputted into a next convolution unit. The server obtains the feature map outputted by a last convolution unit, maps the feature map to a vector through at least one fully connected layer in the image classification model, and then maps each element in the vector to an interval of [0,1] to obtain a class probability vector through a softmax layer, that is, the image classification result of the target image. Each element in the class probability vector indicates the probability that the target image belongs to each class.

Step 3: The server transmits the image classification result to the terminal, and the terminal performs image display based on the image classification result.

In in one embodiment, the terminal can determine images belonging to a same class as an image set based on the image classification result, and display at least one image set viewing entry on a viewing page of the image classification result. An identifier of the type of images can be presented at the image set viewing entry, for example, a word such as character, scenery, food, or the like can be presented, and a representative image of the type of images can further be presented at the image set viewing entry. The user can click on each image set viewing entry to view at least one target image included in the image set. When the user needs to transmit some images to a friend, for example, when transmitting images captured during travel, the images that need to be transmitted can be based on the classified image set. The images that need to be transmitted are quickly determined from the landscape image set; or when the user wants to upload a food photo to a social platform, the user can search for the to-be-shared photo from the food image set, so as to improve the efficiency of search and sharing. The foregoing description of the image display method is merely an example description. This embodiment of the present disclosure sets no limitation on a specific method for displaying images.

All the foregoing technical solutions may be combined in different manners to form other embodiments of the present disclosure.

Figure 6:
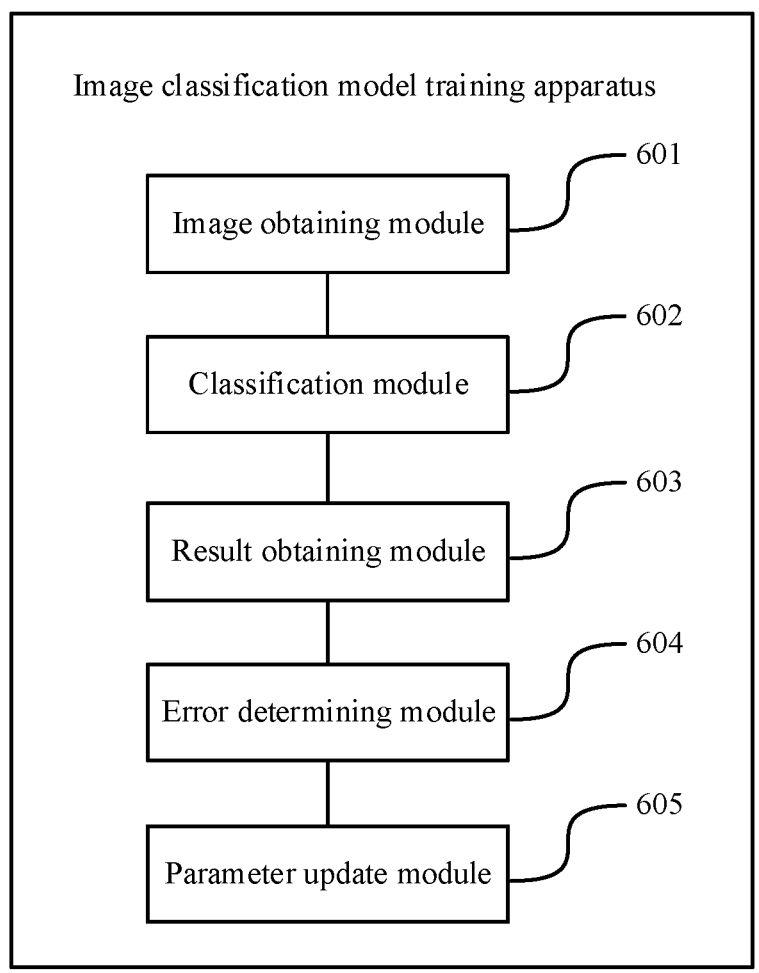
FIG. 6 is a schematic structural diagram of an image classification model training apparatus according to an embodiment of the present disclosure.

FIG. 6 is a schematic structural diagram of an image classification model training apparatus according to an embodiment of the present disclosure. Referring to FIG. 6, the apparatus includes: an image obtaining module 601, configured to separately perform image transformation on at least two first images to obtain at least two second images corresponding to each first image; a classification module 602, configured to input the at least two first images and corresponding second images into an image classification model, and output, by the image classification model, classification results of the at least two first images and classification results of the corresponding second images; a result obtaining module 603, configured to generate, in response to the classification results not meeting a reference condition, reference classification results of the at least two first images based on the classification results of the at least two second images corresponding to the each first image, where the reference classification result of the first image is configured to represent probabilities that the first images and the corresponding at least two second images belong to each class; an error determining module 604, configured to determine a total error value based on an error value between the classification results of the at least two first images and the reference classification results of the at least two first images, and an error value between the classification results of the second images corresponding to the at least two first images and the reference classification results of the at least two first images; and a parameter update module 605, configured to update a parameter of the image classification model based on the total error value.

In in one embodiment, the result obtaining module 603 includes: a first obtaining submodule, configured to separately average the classification results of the at least two second images corresponding to the each first image to obtain first reference data corresponding to the each first image; a second obtaining submodule, configured to obtain second reference data corresponding to the each first image based on first reference data corresponding to the each first image and evaluation data corresponding to each first reference data, where the evaluation data indicates accuracy of the first reference data; and a third obtaining submodule, configured to generate the reference classification results corresponding to the each first image based on edge distribution information of the classification results of the second images, reference edge distribution information, and the second reference data corresponding to the each first image.

In in one embodiment, the second obtaining submodule is configured to average the evaluation data corresponding to the each first reference data to obtain average evaluation data; separately adjust the each first reference data based on a gradient of the average evaluation data to obtain the second reference data corresponding to the each first image.

In in one embodiment, the evaluation data corresponding to the each first reference data is generated by an evaluator based on the each first reference data, where the evaluator is configured to determine the accuracy of the first reference data; and the apparatus further includes: a training module, configured to train the evaluator based on the each first reference data and reference distribution information of the each first reference data, where the reference distribution information of the first reference data indicates reference values of each element in the first reference data.

In in one embodiment, the third obtaining submodule is configured to: determine a weight vector based on edge distribution information of the classification results of the second images and the reference edge distribution information; multiplies the second reference data corresponding to the each first image by an element corresponding to a same position in the weight vector to obtain the adjusted second reference data; and performs normalization processing on the adjusted second reference data to generate the reference classification result.

In in one embodiment, the error determining module 604 is configured to obtain, for any first image, a relative entropy between a reference classification result of the any first image and a classification result of the any first image as a first error value corresponding to the any first image; for the any first image, obtains a sum of a relative entropy of the reference classification result of the any first image and the classification result of the each second image corresponding to the any first image as a second error value of the any first image; and averages a sum of at least two first error values and at least two second error values to obtain the total error value.

In in one embodiment, the apparatus further includes: a mutual information obtaining module, configured to obtain first mutual information between the each first image and the classification results of the each first image; obtain second mutual information between the classification results of the each first image and the classification results of the second images; determine that the classification results meet the reference condition in response to the first mutual information and the second mutual information meeting the reference condition; and in response to the first mutual information and the second mutual information not meeting a reference condition, determining that the classification results does not meet the reference condition.

In in one embodiment, the image obtaining module 601 is configured to obtain the at least two first images; separately perform image transformation on the at least two first images to obtain a plurality of second images, each first image corresponding to at least two second images of the plurality of second images based on at least one of image cropping, image flipping, image color dithering, and image color channel reorganizing.

In the apparatus provided in an embodiment of the present disclosure, classification results of each image outputted by an image classification model are obtained. When the classification results outputted by the image classification model do not meet a reference condition, a reference classification result is constructed based on the classification result outputted by the image classification model. Because the reference classification result can indicate a probability that an image belongs to each class, a parameter of the image classification model is updated to obtain a trained image classification model based on a total error value between the classification result of each image and the reference classification result. The trained image classification model can directly output image classification results with higher accuracy based on an input image, thereby lowering the complexity of an image classification process of the image classification model.

When the image classification model training apparatus provided in the foregoing embodiment performs image classification model training, division of the foregoing functional modules is merely an example for descriptions. During actual application, the foregoing functions may be allocated to and completed by different functional modules as required. That is, the internal structure of the apparatus is divided into different functional modules, to complete all or some of the foregoing described functions. In addition, the image classification model training apparatus and image classification model training method embodiments provided in the foregoing embodiments belong to a same conception. For the implementation process, reference may be made to the method embodiments.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 7:
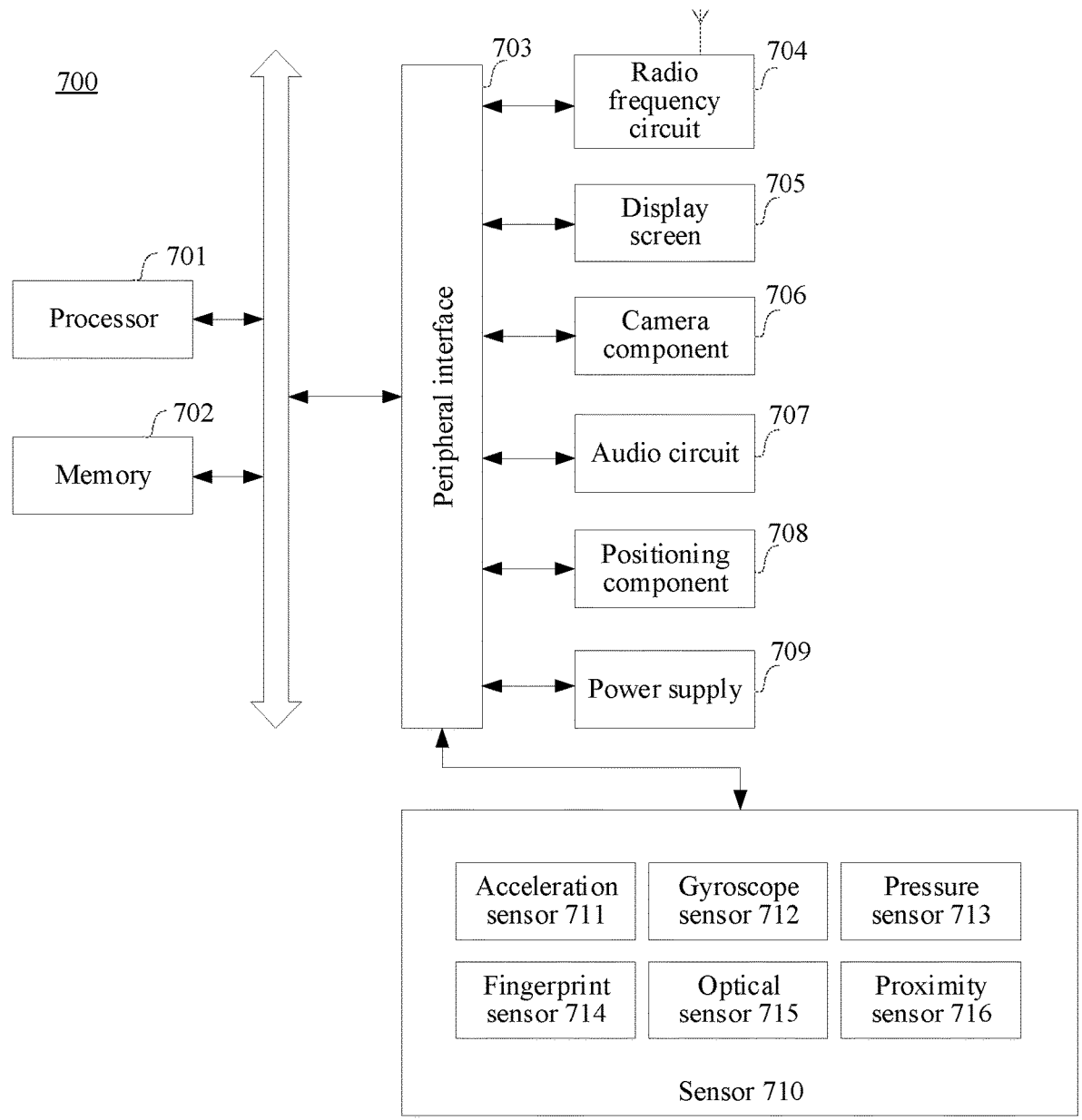
FIG. 7 is a schematic structural diagram of a terminal according to an embodiment of the present disclosure.

The computer device provided in the foregoing technical solution may be implemented as a terminal or a server. For example, FIG. 7 is a schematic structural diagram of a terminal according to an embodiment of the present disclosure. The terminal 700 may be a smart phone, a tablet computer, a moving picture experts group audio layer III (MP3) player, a moving picture experts group audio layer IV (MP4) player, a notebook computer, or a desktop computer. The terminal 700 may further be referred to as user equipment, a portable terminal, a laptop terminal, a desktop terminal, or in other names.

Generally, the terminal 700 includes one or more processors 701 or one or more memories 702.

The processor 701 may include one or more processing cores, for example, a 4-core processor or an 8-core processor. The processor 701 may be implemented by using at least one hardware form of a digital signal processor (DSP), a field-programmable gate array (FPGA), and a programmable logic array (PLA). The processor 701 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 701 may be integrated with a graphics processing unit (GPU). The GPU is configured to render and draw content that needs to be displayed on a display. In some embodiments, the processor 701 may further include an artificial intelligence (AI) processor. The AI processor is configured to process computing operations related to machine learning.

The memory 702 may include one or more computer-readable storage medium that may be non-transitory. The memory 702 may further include a high-speed random access memory (RAM) and a nonvolatile memory, for example, one or more disk storage devices or flash storage devices. In some embodiments, a non-transitory computer-readable storage medium in the memory 702 is configured to store at least one piece of program code, the at least one piece of program code being configured to be executed by the processor 701 to implement the image classification model training method provided in the method embodiments of the present disclosure.

In some embodiments, the terminal 700 may further include a peripheral interface 703 and at least one peripheral device. The processor 701, the memory 702, and the peripheral interface 703 may be connected by a bus or a signal line. Each peripheral may be connected to the peripheral interface 703 by using a bus, a signal cable, or a circuit board. In some embodiments, the peripheral device includes: at least one of a radio frequency (RF) circuit 704, a touch display screen 705, a camera component 706, an audio circuit 707, a positioning component 708, and a power supply 709.

In some embodiments, the terminal 700 may further include one or more sensors 710. The one or more sensors 710 include, but are not limited to: an acceleration sensor 711, a gyro sensor 712, a pressure sensor 713, a fingerprint sensor 714, an optical sensor 715, and a proximity sensor 716.

A person skilled in the art may understand that the structure shown in FIG. 7 does not constitute a limitation to the terminal 700, and the terminal may include more components or fewer components than those shown in the figure, or some components may be combined, or a different component deployment may be used.

Figure 8:
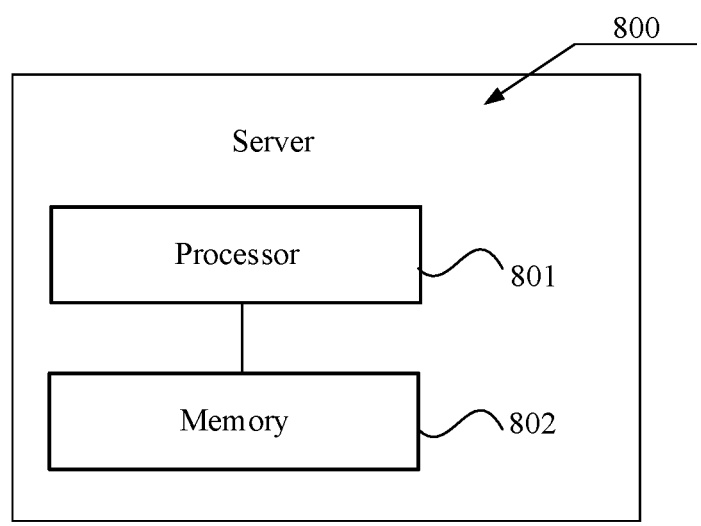
FIG. 8 is a schematic structural diagram of a server according to an embodiment of the present disclosure.

FIG. 8 is a schematic structural diagram of a server according to an embodiment of the present disclosure. The server 800 may vary greatly because a configuration or performance varies, and may include one or more central processing units (CPU) 801 and one or more memories 802. The one or more memories 802 store at least one piece of program code, and the at least one piece of program code is loaded and executed by the one or more processors 801 to implement the methods provided in the foregoing various method embodiments. Certainly, the server 800 may further include components such as a wired or wireless network interface, a keyboard, and an input/output interface, to facilitate inputs/outputs. The server 800 may further include another component configured to implement functions of a device.

In an exemplary embodiment, a computer-readable storage medium, for example, a memory including at least one piece of program code is further provided. The at least one piece of program code may be executed by a processor to implement the image classification model training method in the foregoing embodiments. For example, the computer-readable storage medium may be a read-only memory (ROM), a random access memory (RAM), a compact disc ROM (CD-ROM), a magnetic tape, a floppy disk, an optical data storage device, or the like.

In an exemplary embodiment, a computer program product is further provided, the computer program product including at least one piece of program code, the at least one piece of program code being stored in a computer-readable storage medium. A processor of a computer device reads the at least one piece of program code from the computer-readable storage medium, and the processor executes the at least one piece of program code, to cause the computer device to implement operations performed by the image classification model training method.

A person of ordinary skill in the art may understand that all or some of the steps of the foregoing embodiments may be implemented by hardware, or may be implemented by a program code relevant hardware. The program may be stored in a computer-readable storage medium. The storage medium may be a read-only memory, a magnetic disk, an optical disc, or the like.

The foregoing descriptions are merely example embodiments of the present disclosure, but are not intended to limit the present disclosure. Any modification, equivalent replacement, or improvement made within the spirit and principle of the present disclosure shall fall within the protection scope of the present disclosure.

What is claimed is:

1. An image classification model training method, applied to a computer device, the method comprising:
   separately performing image transformation on at least two first images to obtain a plurality of second images, each first image corresponding to at least two second images of the plurality of second images;
   inputting the at least two first images and the corresponding second images into an image classification model, and outputting, by the image classification model, classification results of the at least two first images and classification results of the corresponding second images;
   in response to the classification results of the at least two first images and the classification results of the corresponding second images not meeting a reference condition, generating reference classification results of the at least two first images based on the classification results of the corresponding second images, the reference classification results of the first images being configured to represent probabilities that the first images and the corresponding at least two second images belong to each class;
   determining a total error value based on an error value between the classification results of the at least two first images and the reference classification results of the at least two first images, and an error value between the classification results of the second images corresponding to the at least two first images and the reference classification results of the at least two first images; and
   updating a parameter of the image classification model based on the total error value, and determining that training is completed when the classification results of the at least two first images and the classification results of the corresponding second images obtained by an updated image classification model meet the reference condition.

2. The method according to claim 1, wherein the generating reference classification results of the at least two first images based on the classification results of the corresponding second images comprises:
   separately averaging the classification results of the at least two second images corresponding to the each first image to obtain first reference data corresponding to the each first image;
   determining second reference data corresponding to the each first image based on the first reference data corresponding to the each first image and evaluation data corresponding to each first reference data, wherein the evaluation data indicates an accuracy of the first reference data; and
   generating the reference classification results corresponding to the each first image based on edge distribution information of the classification results of the second images, reference edge distribution information, and the second reference data corresponding to the each first image.

3. The method according to claim 2, wherein the determining second reference data corresponding to the each first image based on first reference data corresponding to the each first image and evaluation data corresponding to each first reference data comprises:
   averaging the evaluation data corresponding to the each first reference data to obtain average evaluation data; and
   separately adjusting the each first reference data based on a gradient of the average evaluation data to obtain the second reference data corresponding to the each first image.

4. The method according to claim 3, wherein the evaluation data corresponding to the each first reference data is generated by an evaluator based on the each first reference data, and the evaluator is configured to determine the accuracy of the first reference data; and the method further comprises:
   training the evaluator based on the each first reference data and reference distribution information of the each first reference data, wherein the reference distribution information of the first reference data indicates reference values of each element in the first reference data.

5. The method according to claim 2, wherein the generating the reference classification results corresponding to the each first image based on edge distribution information of the classification results of the second images, reference edge distribution information, and the second reference data corresponding to the each first image comprises:
   determining a weight vector based on the edge distribution information of the classification results of the second images and the reference edge distribution information;
   multiplying the second reference data corresponding to the each first image by an element corresponding to a same position in the weight vector to obtain an adjusted second reference data; and
   performing normalization processing on the adjusted second reference data to generate the reference classification result.

6. The method according to claim 1, wherein the determining a total error value, based on an error value between the classification results of the at least two first images and the reference classification results of the at least two first images, and an error value between the classification results of the second images corresponding to the at least two first images and the reference classification results of the at least two first images comprises:
   for one first image of the at least two first images, obtaining a relative entropy between a reference classification result of the one first image and a classification result of the one first image as a first error value corresponding to the one first image;
   for the one first image, obtaining a sum of a relative entropy of the reference classification result of the one first image and the classification result of the each second image corresponding to the one first image as a second error value of the one first image; and averaging a sum of at least two first error values and at least two second error values to obtain the total error value.

7. The method according to claim 1, wherein after the inputting the at least two first images and corresponding second images into an image classification model, and outputting, by the image classification model, classification results of the at least two first images and classification results of the corresponding second images, the method further comprises:
obtaining first mutual information between the each first image and the classification results of the each first image;
obtaining second mutual information between the classification results of the each first image and the classification results of the corresponding second images;
in response to the first mutual information and the second mutual information meeting a reference condition, determining that the classification results meet the reference condition; and
in response to the first mutual information and the second mutual information not meeting a reference condition, determining that the classification results does not meet the reference condition.

8. The method according to claim 1, wherein the separately performing image transformation on at least two first images to obtain a plurality of second images, each first image corresponding to at least two second images of the plurality of second images comprises:
separately performing image transformation on the at least two first images to obtain a plurality of second images, each first image corresponding to at least two second images of the plurality of second images based on at least one of image cropping, image flipping, image color dithering, and image color channel reorganizing.

9. An image classification model training apparatus, comprising one or more processors and one or more memories, the one or more memories storing at least one piece of program code, the at least one piece of program code being loaded and executed by the one or more processors to perform:
separately performing image transformation on at least two first images to obtain a plurality of second images, each first image corresponding to at least two second images of the plurality of second images;
inputting the at least two first images and the corresponding second images into an image classification model, and outputting, by the image classification model, classification results of the at least two first images and classification results of the corresponding second images;
in response to the classification results of the at least two first images and the classification results of the corresponding second images not meeting a reference condition, generating reference classification results of the at least two first images based on the classification results of the corresponding second images, the reference classification results of the first images being configured to represent probabilities that the first images and the corresponding at least two second images belong to each class;
determining a total error value based on an error value between the classification results of the at least two first images and the reference classification results of the at least two first images, and an error value between the classification results of the second images corresponding to the at least two first images and the reference classification results of the at least two first images; and
updating a parameter of the image classification model based on the total error value, and determining that training is completed when the classification results of the at least two first images and the classification results of the corresponding second images obtained by an updated image classification model meet the reference condition.

10. The apparatus according to claim 9, wherein the generating reference classification results of the at least two first images based on the classification results of the corresponding second images comprises:
separately averaging the classification results of the at least two second images corresponding to the each first image to obtain first reference data corresponding to the each first image;
determining second reference data corresponding to the each first image based on the first reference data corresponding to the each first image and evaluation data corresponding to each first reference data, wherein the evaluation data indicates an accuracy of the first reference data; and
generating the reference classification results corresponding to the each first image based on edge distribution information of the classification results of the second images, reference edge distribution information, and the second reference data corresponding to the each first image.

11. The apparatus according to claim 10, wherein the determining second reference data corresponding to the each first image based on first reference data corresponding to the each first image and evaluation data corresponding to each first reference data comprises:
averaging the evaluation data corresponding to the each first reference data to obtain average evaluation data; and
separately adjusting the each first reference data based on a gradient of the average evaluation data to obtain the second reference data corresponding to the each first image.

12. The apparatus according to claim 11, wherein the evaluation data corresponding to the each first reference data is generated by an evaluator based on the each first reference data, and the evaluator is configured to determine the accuracy of the first reference data; and the one or more processors are further configured to perform:
training the evaluator based on the each first reference data and reference distribution information of the each first reference data, wherein the reference distribution information of the first reference data indicates reference values of each element in the first reference data.

13. The apparatus according to claim 10, wherein the generating the reference classification results corresponding to the each first image based on edge distribution information of the classification results of the second images, reference edge distribution information, and the second reference data corresponding to the each first image comprises:
determining a weight vector based on the edge distribution information of the classification results of the second images and the reference edge distribution information;
multiplying the second reference data corresponding to the each first image by an element corresponding to a same position in the weight vector to obtain an adjusted second reference data; and performing normalization processing on the adjusted second reference data to generate the reference classification result.

14. The apparatus according to claim 9, wherein the determining a total error value, based on an error value between the classification results of the at least two first images and the reference classification results of the at least two first images, and an error value between the classification results of the second images corresponding to the at least two first images and the reference classification results of the at least two first images comprises:
   for one first image of the at least two first images, obtaining a relative entropy between a reference classification result of the one first image and a classification result of the one first image as a first error value corresponding to the one first image;
   for the one first image, obtaining a sum of a relative entropy of the reference classification result of the one first image and the classification result of the each second image corresponding to the one first image as a second error value of the one first image; and
   averaging a sum of at least two first error values and at least two second error values to obtain the total error value.

15. The apparatus according to claim 9, wherein after the inputting the at least two first images and corresponding second images into an image classification model, and outputting, by the image classification model, classification results of the at least two first images and classification results of the corresponding second images, the one or more processors are further configured to perform:
   obtaining first mutual information between the each first image and the classification results of the each first image;
   obtaining second mutual information between the classification results of the each first image and the classification results of the corresponding second images;
   in response to the first mutual information and the second mutual information meeting a reference condition, determining that the classification results meet the reference condition; and
   in response to the first mutual information and the second mutual information not meeting a reference condition, determining that the classification results does not meet the reference condition.

16. The apparatus according to claim 9, wherein the separately performing image transformation on at least two first images to obtain a plurality of second images, each first image corresponding to at least two second images of the plurality of second images comprises:
   separately performing image transformation on the at least two first images to obtain a plurality of second images, each first image corresponding to at least two second images of the plurality of second images based on at least one of image cropping, image flipping, image color dithering, and image color channel reorganizing.

17. A non-transitory computer-readable storage medium, storing at least one piece of program code, the at least one piece of program code being loaded and executed by a processor to perform:
   separately performing image transformation on at least two first images to obtain a plurality of second images, each first image corresponding to at least two second images of the plurality of second images;
   inputting the at least two first images and the corresponding second images into an image classification model, and outputting, by the image classification model, classification results of the at least two first images and classification results of the corresponding second images;
   in response to the classification results of the at least two first images and the classification results of the corresponding second images not meeting a reference condition, generating reference classification results of the at least two first images based on the classification results of the corresponding second images, the reference classification results of the first images being configured to represent probabilities that the first images and the corresponding at least two second images belong to each class;
   determining a total error value based on an error value between the classification results of the at least two first images and the reference classification results of the at least two first images, and an error value between the classification results of the second images corresponding to the at least two first images and the reference classification results of the at least two first images; and
   updating a parameter of the image classification model based on the total error value, and determining that training is completed when the classification results of the at least two first images and the classification results of the corresponding second images obtained by an updated image classification model meet the reference condition.

18. The storage medium according to claim 17, wherein the generating reference classification results of the at least two first images based on the classification results of the corresponding second images comprises:
   separately averaging the classification results of the at least two second images corresponding to the each first image to obtain first reference data corresponding to the each first image;
   determining second reference data corresponding to the each first image based on the first reference data corresponding to the each first image and evaluation data corresponding to each first reference data, wherein the evaluation data indicates an accuracy of the first reference data; and
   generating the reference classification results corresponding to the each first image based on edge distribution information of the classification results of the second images, reference edge distribution information, and the second reference data corresponding to the each first image.

19. The storage medium according to claim 18, wherein the determining second reference data corresponding to the each first image based on first reference data corresponding to the each first image and evaluation data corresponding to each first reference data comprises:
   averaging the evaluation data corresponding to the each first reference data to obtain average evaluation data; and
   separately adjusting the each first reference data based on a gradient of the average evaluation data to obtain the second reference data corresponding to the each first image.

20. The storage medium according to claim 17, wherein the determining a total error value, based on an error value between the classification results of the at least two first images and the reference classification results of the at least two first images, and an error value between the classification results of the second images corresponding to the at least two first images and the reference classification results of the at least two first images comprises:
- for one first image of the at least two first images, obtaining a relative entropy between a reference classification result of the one first image and a classification result of the one first image as a first error value corresponding to the one first image;
- for the one first image, obtaining a sum of a relative entropy of the reference classification result of the one first image and the classification result of the each second image corresponding to the one first image as a second error value of the one first image; and
- averaging a sum of at least two first error values and at least two second error values to obtain the total error value.

* * * * *